3,332,861
POLISHING COMPOSITION PRODUCED BY ELECTROLYTIC PROCESS
Jay G. Diamond, Washington, D.C.
(2 Papadiamandopoulou St., Athens (T 612), Greece)
No Drawing. Filed July 10, 1963, Ser. No. 294,184
7 Claims. (Cl. 204—72)

ABSTRACT OF THE DISCLOSURE

This invention is a cleaning and/or polishing composition prepared by passing an electric current through electrodes in contact with an aqueous mixture of a water soluble fatty acid salt, a lower aliphatic acid and silicic acid.

This invention relates to waxy cleaning and polishing compositions and more particularly to compositions that are, at least in part, based on aqueous electrolysis products. This invention also relates to a method for obtaining these products.

The present invention is concerned with superior cleaning and polishing compositions and the preparation of these compositions. Compositions prepared in accordance with the present invention are superior to other waxy cleaning and polishing compositions in being easier to apply and, more importantly, easier to buff to a high luster.

The compositions of the present invention are the electrolytic products of an aqueous mixture of a lower aliphatic acid, silicic acid and a fatty acid salt.

The waxy substance is comprised of one or more fatty acids that are either made soluble in water by saponification or preferably by initially employing a fatty acid salt that is at least soluble to some extent in water. Representative of these materials are the alkaline earth and alkali metal salts of palmitic, oleic, linoleic, linolenic, stearic and mixtures thereof. The preferred material being the sodium salt of stearic acid.

The organic acid used is preferably glacial acetic acid although lower aliphatic acids equivalent in strength and compatible with the other ingredients can be used. In general the amount of acid used should be based on the amount of fatty acid salt present in the mixture. A ratio of 0.1–10:1 by weight, aliphatic acid to fatty acid salt respectively is suitable.

In addition to a lower aliphatic acid, another essential acid ingredient in silicic acid (meta or ortho). The amount of silicic acid that can be used will vary widely. Based on the fatty acid salt present in the mixture the silicic acid can vary from 0.2–2 to each part by weight of fatty acid salt. Preferred amounts of ingredients, the degree of electrolysis and other operating conditions are about the same as those disclosed in Example 1.

Essential to the present invention is the step of passing a current through an aqueous mixture of the ingredients. The current necessary may be defined as being of sufficient magnitude to cause at least some noticeable electrolysis of water during a period of about an hour. Stated another way, the current used should be sufficient to cause a chemical change in the mixture in contact with the electrodes and the change should be visible to the naked eye, i.e. the formation of hydrogen gas bubbles at the cathode. It will be appreciated that the exact limits of operative ranges can be readily determined by one skilled in the art. It is sufficient to electrolyze the aqueous mixture until a visible change takes place for some beneficial effect although electrolysis should be continued for longer periods or equivalent to about an hour or more using the charger defined in Example 1 at room temperature. The liquid in the electrolytic product resulting from subjecting the aforedisclosed ingredients to the current will generally have a milky appearance which is attributed to finely divided waxy solids in colloidal solution. It is believed that these solids can result only from electrolysis and are responsible for the observed superiority of the present compositions over commercially available compositions.

The following examples are illustrative but not intended to be limiting:

Example 1

To a steel container 6" dia. 7" deep were added 15 grams of sodium stearate, 15 grams of silicic acid (certified Fisher). 7 grams of glacial acetic acid and 7 grams of tap water. Across the top of the container from a piece of wood was suspended a steel bar ⅛" thick and ½" wide. The steel was centered and immersed in the mixture to form the negative electrode. The wall of the container formed the positive electrode. The mixture was initially stirred into a paste with an additional 7 grams of water added and electrolysis begun using direct current of 2 to 4 amps with a voltage of 6.3 volts.

When additional 7 gram increments of water were added to bring the total to 35 grams, electrolysis became vigorous. Electrolysis was discontinued after about an hour with additional water added to total 63 grams. During the process a build up of suds resembling a creamy foam centered around the steel bar electrode. The liquid, initially pearl grey in color, turned somewhat darker in color as the process continued. After electrolysis the product was a liquid with suds on top and some flaky sediment on the bottom.

On heating a small quantity of the product an insoluble wax separated. The wax however, was soluble in hot turpentine and cold Varsol. The remainder of the aqueous product proved to have cleaning power as well as being useful as a polish. It finds particular use for floors, tiles, leather and other surfaces where protection is desired. The product treated with an organic solvent such as turpentine, alcohol and Varsol finds use as an emulsion for cleaning and polishing, particularly on surfaces that require treatment with a solvent. Further the use of an organic solvent facilitates the inclusion of additives found in automobile and furniture polishes such as beeswax, microcrystalline wax and the like.

Example 2

To a glass container 3" dia. and 4" deep were added the same ingredients, namely 15 grams each of silicic acid and sodium stearate, 7 grams each of glacial acetic acid and tap water. Additional 7 gram increments of tap water were added after electrolysis was begun. The same source of current referred to in Example 1 was used. The electrodes were formed of 2 rods approximately 3 mm. diameter suspended from a non-conductive strip. The distance between rods was varied from more than 2 cm. to slightly less than 3 mm. apart. The latter distance was found most effective. As the process continued a deposit formed on the bottom and by moving the electrodes down to the bottom the precipitate is dissipated in the area of the electrodes. The electrodes were then moved relative to the bottom. After more than three hours, a total of 63 grams of water had been added and electrolysis was discontinued.

The final aqueous product was pearl gray in color and was especially useful when applied to floors. Using a sponge mop, the original product either as obtained or as a "master mix" when diluted with an equal amount of water, applies easily and buffs to a high luster after drying. The addition of borax and/or the use of a scrubber instead of a sponge mop cleans especially well and also results in a coating that readily buffs to a glossy surface. Instead of borax other well-known cleaners and detergents, particularly those that form alkaline solutions can be used.

I claim:

1. The process of preparing an aqueous cleaning and polishing composition comprising contacting an aqueous mixture of a water-soluble fatty acid salt, a lower aliphatic acid and silicic acid with electrodes including a cathode spaced apart from an anode, passing a current through said electrodes for a time sufficient to effect the formation of hydrogen gas at the cathode.

2. The process of claim 1 wherein the lower aliphatic acid is glacial acetic acid.

3. The process of claim 2 wherein the acetic acid is present in the amount of 0.1–10 by weight of each part of fatty acid salt.

4. The process of claim 2 wherein the fatty acid salt is sodium stearate.

5. The process of claim 1 wherein the amount of silicic acid present is 0.2–2 by weight for each part of fatty acid salt.

6. A cleaning and polishing composition produced by the process of claim 1.

7. A cleaning and polishing composition produced by the process of claim 4.

References Cited

UNITED STATES PATENTS

| | | | |
|---|---|---|---|
| 2,592,686 | 4/1952 | Groombridge et al. | 204—72 |
| 2,678,875 | 5/1954 | Spooner | 252—136 |

FOREIGN PATENTS 1,056,316  4/1959  Germany.

JOHN H. MACK, *Primary Examiner.*

H. M. FLOURNOY, *Assistant Examiner.*

HOWARD S. WILLIAMS, *Examiner.*